United States Patent
Loevenguth et al.

(10) Patent No.: US 10,726,398 B2
(45) Date of Patent: *Jul. 28, 2020

(54) MOBILE AGENT POINT-OF-SALE (POS)

(71) Applicant: The Western Union Company, Englewood, CO (US)

(72) Inventors: Rebecca Loevenguth, Denver, CO (US); Sanjay Challani, East Windsor, NJ (US)

(73) Assignee: The Western Union Company, Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/131,290

(22) Filed: Sep. 14, 2018

(65) Prior Publication Data

US 2019/0180251 A1     Jun. 13, 2019

Related U.S. Application Data

(63) Continuation of application No. 14/531,188, filed on Nov. 3, 2014, now Pat. No. 10,096,006, which is a
(Continued)

(51) Int. Cl.
*G06Q 20/02*     (2012.01)
*G06Q 20/10*     (2012.01)
(Continued)

(52) U.S. Cl.
CPC ......... *G06Q 20/02* (2013.01); *G06Q 20/0855* (2013.01); *G06Q 20/10* (2013.01);
(Continued)

(58) Field of Classification Search
CPC .... G06Q 20/10; G06Q 40/00; G06Q 20/3223; G06Q 20/02; G06Q 20/202;
(Continued)

(56) References Cited

U.S. PATENT DOCUMENTS 6,725,383 B2   4/2004  Kyle
7,254,548 B1   8/2007  Tannenbaum
(Continued)

OTHER PUBLICATIONS

Merritt, Cynthia. "Mobile Money Transfer Services: The Next Phase in the Evolution in Person-to-Person Payments." (2010).*
(Continued)

*Primary Examiner* — Asfand M Sheikh
(74) *Attorney, Agent, or Firm* — Kilpatrick Townsend & Stockton, LLP

(57) ABSTRACT

Systems and methods are disclosed for conducting transactions and financial transfers utilizing a mobile device communicatively coupled with a mobile communications network and executing a mobile point-of-sale application. According to some embodiments, the mobile point-of-sale application is adapted to conduct money transfer transactions by communicating transaction information through the mobile communications network to a money transfer provider system that processes the money transfer and communicates receipt information to the mobile point-of-sale application. Additionally, according to some embodiments, an account associated with an agent of the money transfer provider can be used in money transfer transactions conducted by the mobile point-of-sale application.

20 Claims, 7 Drawing Sheets

Related U.S. Application Data continuation of application No. 12/755,844, filed on Apr. 7, 2010, now Pat. No. 8,880,425.

(51) Int. Cl.

| | | |
|---|---|---|
| *G06Q 20/40* | (2012.01) | |
| *G06Q 30/06* | (2012.01) | |
| *G06Q 20/08* | (2012.01) | |
| *G06Q 20/20* | (2012.01) | |
| *G06Q 20/32* | (2012.01) | |
| *G06Q 40/00* | (2012.01) | |

(52) U.S. Cl.
CPC ........... *G06Q 20/20* (2013.01); *G06Q 20/202* (2013.01); *G06Q 20/32* (2013.01); *G06Q 20/3223* (2013.01); *G06Q 20/3226* (2013.01); *G06Q 20/40145* (2013.01); *G06Q 30/0613* (2013.01); *G06Q 40/00* (2013.01)

(58) Field of Classification Search
CPC ......... G06Q 20/40145; G06Q 20/0855; G06Q 20/20; G06Q 20/32; G06Q 20/3226; G06Q 30/0613
See application file for complete search history.

(56) References Cited

U.S. PATENT DOCUMENTS

| | | | |
|---|---|---|---|
| 7,356,515 | B2 | 4/2008 | Oppat et al. |
| 7,416,118 | B2 | 8/2008 | Throckmorton et al. |
| 7,765,408 | B1 | 7/2010 | Geosimonian |
| 7,865,439 | B2 | 1/2011 | Seifert et al. |
| 8,083,137 | B2 | 12/2011 | Tannenbaum |
| 8,504,473 | B2 | 8/2013 | Paintin et al. |
| 8,880,425 | B2 | 11/2014 | Loevenguth et al. |
| 10,096,006 | B2 | 10/2018 | Loevenguth et al. |
| 2001/0000535 | A1 | 4/2001 | Lapsley et al. |
| 2002/0156728 | A1 | 10/2002 | Jaschhof et al. |
| 2003/0074310 | A1 | 4/2003 | Grovit et al. |
| 2003/0220841 | A1 | 11/2003 | Maritzen |
| 2006/0206419 | A1 | 9/2006 | Rosti et al. |
| 2007/0208662 | A1 | 9/2007 | Jeronimus et al. |
| 2008/0167017 | A1 | 7/2008 | Wentker et al. |
| 2009/0070257 | A1 | 3/2009 | Csoka |
| 2011/0251892 | A1* | 10/2011 | Laracey ............. G06Q 30/0253 705/14.51 |
| 2011/0251906 | A1 | 10/2011 | Loevenguth et al. |
| 2013/0117174 | A1 | 5/2013 | Cole et al. |
| 2015/0161588 | A1 | 6/2015 | Loevenguth et al. |

OTHER PUBLICATIONS

Williamson, Gregory D., "Enhanced Authentication in Online Banking," Journal of Economic Crime Management, Fall 2006, vol. 4, Issue 2, 42 pages.

U.S. Appl. No. 14/531,188, filed Nov. 3, 2014, Non-Final Rejection dated Apr. 8, 2015, all pages.

U.S. Appl. No. 14/531,188, filed Nov. 3, 2014, Non-Final Rejection dated Sep. 24, 2015, all pages.

U.S. Appl. No. 14/531,188, filed Nov. 3, 2014, Final Rejection dated May 16, 2016, all pages.

U.S. Appl. No. 14/531,188, filed Nov. 3, 2014, Non-Final Rejection dated Aug. 26, 2016, all pages.

U.S. Appl. No. 14/531,188, filed Nov. 3, 2014, Final Rejection dated Mar. 2, 2017, all pages.

U.S. Appl. No. 14/531,188, filed Nov. 3, 2014, Non-Final Rejection dated Oct. 24, 2017, all pages.

U.S. Appl. No. 14/531,188, filed Nov. 3, 2014, Notice of Allowance dated May 30, 2018, all pages.

U.S. Appl. No. 12/755,844, filed Apr. 7, 2010, Non-Final Rejection dated Apr. 26, 2012, all pages.

U.S. Appl. No. 12/755,844, filed Apr. 7, 2010, Final Rejection dated Aug. 2, 2012, all pages.

U.S. Appl. No. 12/755,844, filed Apr. 7, 2010, Non-Final Rejection dated Dec. 9, 2013, all pages.

U.S. Appl. No. 12/755,844, filed Apr. 7, 2010, Notice of Allowance dated Jun. 30, 2014, all pages.

\* cited by examiner

MOBILE AGENT POINT-OF-SALE (POS)

CROSS REFERENCE TO RELATED APPLICATIONS

This application is a continuation of U.S. patent application Ser. No. 14/531,188, filed Nov. 3, 2014, and entitled "MOBILE AGENT POINT-OF-SALE (POS)," which is a continuation U.S. patent application Ser. No. 12/755,844, filed Apr. 7, 2010, issued as U.S. Pat. No. 8,880,425, and entitled, "MOBILE AGENT POINT-OF-SALE (POS)," the entire disclosure of which is hereby incorporated by reference, for all purposes, as if fully set forth herein.

BACKGROUND OF THE INVENTION

Money transfer services are used extensively to transfer money and pay bills through the use of wire transfers, money orders, and other transactions. The use of such services, however, usually requires a representative of a money transfer service provider to have a fixed physical location with Internet access, having one or more Point-Of-Sale (POS) terminals, stationary computer equipment, and printers. "Wiring" money to a receiver, therefore, requires a sender to travel to the representative's fixed location to deposit the money in person. These locations may be limited to urban areas where the representative can meet a high demand for money transfer services, and maintaining a physical location with stationary equipment may be costly.

The following invention serves to remedy these and other problems.

BRIEF SUMMARY OF THE INVENTION

This invention relates generally to financial transfers. More specifically, the invention relates to systems and methods of conducting money transfer and other transactions utilizing a mobile device running a mobile point-of-sale application and connected to a mobile communications network.

Systems and methods are disclosed for conducting transactions and financial transfers utilizing a mobile device communicatively coupled with a mobile communications network and executing a mobile point-of-sale application. According to some embodiments, the mobile point-of-sale application can be adapted to conduct money transfer transactions by communicating transaction information through the mobile communications network to a money transfer provider system that processes the money transfer and communicates receipt information to the mobile point-of-sale application. Additionally, according to some embodiments, an account associated with an agent of the money transfer provider can be used in money transfer transactions conducted by the mobile point-of-sale application.

The present invention can be further adapted to conduct international or cross-boarder transactions. For example, the mobile device running the mobile point-of-sale application can be used in a transaction to send money where the mobile device is located in one country and a recipient of the money is located in a second country. When the mobile point-of-sale application can be used to send money, the money transfer provider system can be adapted to withdraw money from an account associated with an agent of the money transfer provider when the agent collects the money for the transaction. Furthermore, according to some embodiments of the present invention, the mobile point-of-sale application can be adapted to calculate and provide an exchange rate between a plurality of currencies. Other embodiments of the present invention can provide for paying bills or funding prepaid cards by utilizing the mobile point-of-sale application.

The systems and methods disclosed can also provide for transactions to receive money utilizing a mobile device running the mobile point-of-sale application. Such transactions can also include international money transfers, where the mobile device running the mobile point-of-sale application is located in one country and the money is sent from a source located in a second country. In such instances, the money transfer provider system can be adapted to transfer money to an account associated with the agent of the money transfer provider when the agent provides money to the recipient.

The present invention can use several different types of accounts associated with an agent for transfers involving the mobile point-of-sale application. Certain embodiments can include one of the following: a prepaid account, a credit card account, and a bank account.

According to some embodiments, the mobile point-of-sale application can utilize different functionality of the mobile device. For instance, the mobile point-of-sale application can be configured to transmit data representing one or more photos taken from a camera coupled to the mobile device during a transaction.

The systems and methods disclosed also can provide for transactions in addition to money transfers. For instance, the mobile point-of-sale application can gather and send data from an applicant to a money transfer provider during an on-boarding process to be used in determining whether to allow an applicant to become an agent of the money transfer provider. In some instances, the mobile point-of-sale application can be adapted to gather biometric or other data gathered from a device coupled with the mobile device running the mobile point-of-sale application. The mobile point-of-sale application can further be used to initiate phone-based training and download additional information from the transfer service provider, such as marketing, training, transaction statistics, compensation levels, or other materials, according to further embodiments. This functionality ultimately allows anyone with a phone or other mobile device to become an agent of the money transfer provider, which, in turn, gives a customer the ability to send or receive money transfers virtually anywhere through the use of a mobile device.

DETAILED DESCRIPTION OF THE INVENTION

Figure 1:
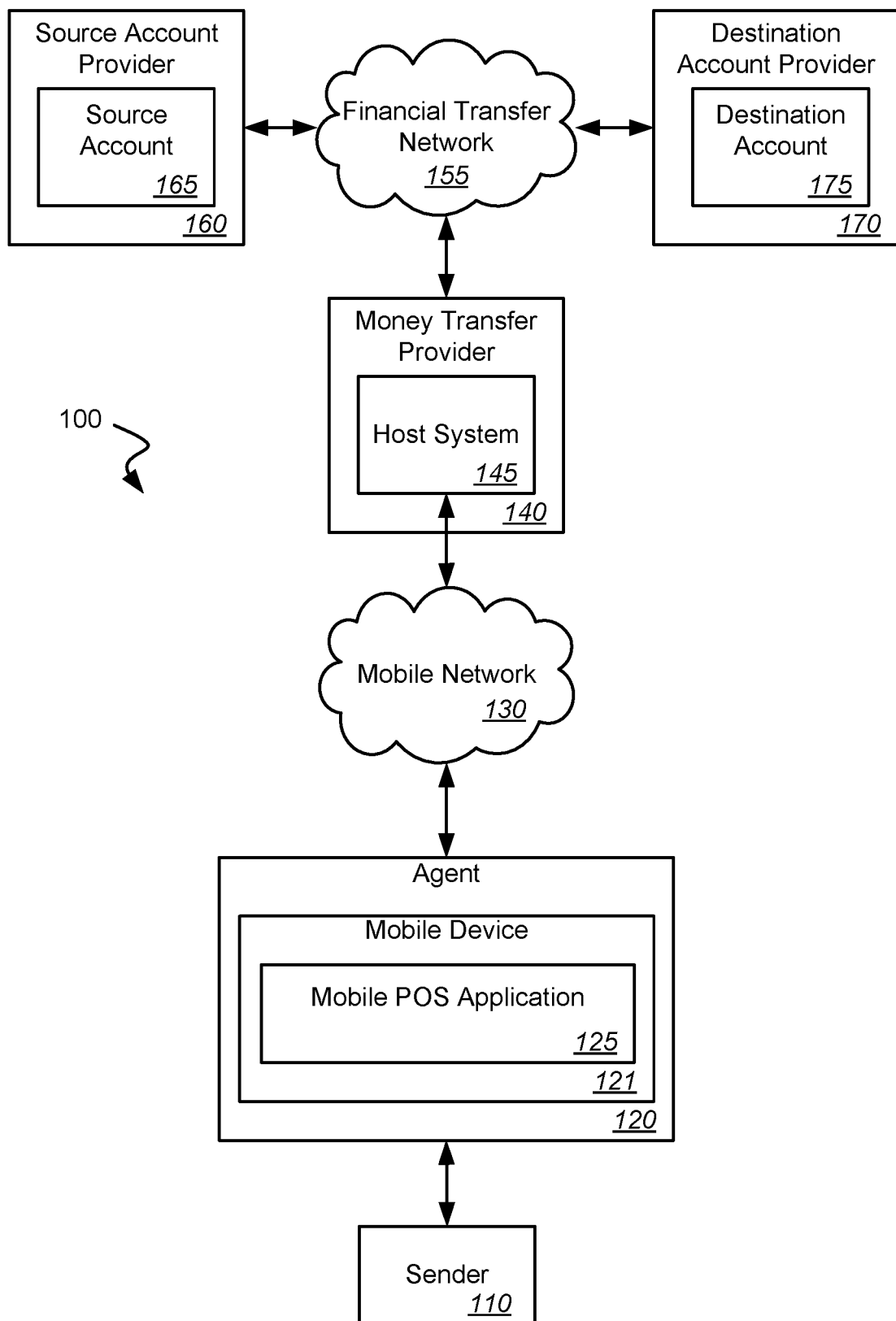
FIG. 1 is a block diagram illustrating an exemplary system for making financial transfers with a mobile POS application, according to one embodiment of the present invention.

Embodiments of the present invention provide systems and methods for enabling money transfer and related transactions utilizing a mobile device running a mobile point-of-sale (POS) application. For example, a money transfer transaction can be initiated through the mobile POS application, which can run on a mobile device used or controlled by an agent of the money transfer provider. The mobile POS application can include the ability to send and receive money transfer transactions without the need for an additional, fixed POS device. This enables an agent to provide a customer the ability to send or receive money transfers virtually anywhere through the use of a mobile device.

According to some embodiments, a sender can initiate a transaction to send money through an agent having a mobile device running a mobile POS application. The agent can then collect identification and payment information from the sender, which can then be transmitted by the mobile POS device through a wireless network to a money transfer provider system. According to some embodiments, the money transfer provider system can then use the identification and payment information to then make a determination of whether to process the money transaction payment. This determination can be made based on a set of defined rules, which can take into account various governmental and/or banking rules, service conditions, etc. Upon determining to process the money transaction payment, the money transfer provider system can execute the payment by transferring money from a source account to one or more destinations, in accordance with delivery options selected for the payment. The selected delivery options can be based on information provided by the sender, agent, money transfer provider, and/or a recipient. The delivery options can include, for example, delivering funds to a bank account of a recipient, delivering funds to a pre-paid account, delivering funds to a funds withholding system, delivering funds to a third party, delivering a draft check, delivering funds through an Automated Teller Machine (ATM), and other options. It will be understood that for many money transfer transactions, the money transfer provider system can transfer money through a financial transfer network. It will further be understood that the money transfer provider system can store the money transaction payment information in a queue for later execution of the money transfer. The financial transfer network can then send a notification of payment to the receiver of the money and return a receipt to the mobile POS application, which is then given to the sender.

According to further embodiments, the mobile POS application can provide for additional data to be gathered to conduct adequate Know Your Customer (KYC) and consumer identification. For example, the POS application can run on a portable device coupled to or comprising a camera, by which the agent can capture the photograph of a customer and a photograph of the customer's valid photo identification. The POS can be further adapted to embed accompanying information with photographs, such as a timestamp, and transmit the photographs to a remote computer operated by the money transfer provider. And can link the photographs with a transaction or the like.

The mobile POS application may further use information gathered from a sender and/or recipient of a money transfer transaction to create an account with the money transfer provider. Such an account may be used to store information in order to uniquely identify the particular sender and/or receiver, and the information may be stored locally by the POS application or centrally by the money transfer provider. Information can include name, address, phone number, email address, a customer number, account information (e.g., stored value account identifier, bank account number and/or ABA routing number), tax number (e.g., Social Security Number or Taxpayer Identification Number), drivers' license number, state ID number, student ID number, and other information. Accounts may be used to expedite the money transfer process, bypassing the need to gather necessary identification information for a sender or receiver by maintaining this information on a secure database. The money transfer provider can further use such accounts to provide rewards incentives to repeat customers.

It will be understood that embodiments of the mobile POS application can accommodate numerous types of money transactions, international or domestic. For transactions involving paying or receiving money in cash, an account associated with the agent collecting or paying out the money can be used by the money transfer provider to reduce fraud. For example, if a sender pays for a send money transaction in cash, the agent can collect the funds and submit the money transfer information via the mobile POS application. The money transfer provider system can then process the transaction by withdrawing the amount from the account associated with the agent who collected the funds. The amount withdrawn may or may not include fees collected by the agent. A similar process occurs when a recipient of a money transfer transaction receives cash. In this case, the agent can pay the properly identified recipient in cash, submitting the payout information through the mobile POS application to the money transfer provider system, which credits the account associated with the agent for the amount paid out.

It will be understood that an account associated with an agent can take a variety of forms. For instance, the account may be a bank account, a credit or credit card account, or a prepaid account. The account may be maintained by the money transfer provider directly, or it may be maintained by another entity, such as a bank, through which the money transfer provider can withdraw from, deposit into, credit, and/or debit the account. The money transfer provider can have access to information regarding the account, and can further require the agent to have a minimum amount in the account in order to process certain transactions involving the account. It will be understood that an account can be associated with an agent in a variety of ways, including, but not limited to, the money transfer provider maintaining a database that provides account information for an agent, and the agent account information being transmitted by the mobile POS application as part of a money transfer transaction. Alternatively, the account can be associated with the mobile POS application running on a particular mobile device, such that a money transfer provider system receiving transaction information from a mobile POS application running on a particular mobile device will be associated with a particular account. A unique identifier associated with the particular mobile device can be maintained by the mobile POS application and can comprise one or more of a variety of identifiers including, but not limited to, a personal identification number (PIN) assigned by the money transfer provider, a social security number, a drivers license number, a media access control (MAC) address, an electronic serial number (ESN), and an international mobile equipment identifier (IMEI).

Further transactions may be accommodated by the mobile POS application. For example, the mobile POS application can be adapted to enable a customer to pay bills—whether the bills are for the customer or another person—by transferring money to a biller. According to some embodiments, the biller may reside in the same or a different country from the customer. The mobile POS device may further be adapted to accommodate transactions involving adding additional funds to a prepaid phone card or other prepaid account associated with the customer or another person. According to some embodiments, the entity maintaining the prepaid account may reside in the same or a different country from the customer. The mobile POS device can further be adapted to calculate an exchange rate for such transactions involving different currencies, as detailed below.

Embodiments of the mobile POS application also enable a customer to check the status of a money transfer or other transaction based on a unique identifier for the transaction. For example, a money transfer provider can provide a transaction number, such as a Money Transfer Control Number (MTCN), to a sender sending a money transfer payment. A customer, for example the sender or the recipient of funds, can later provide the transaction number to an agent having a mobile device running the mobile POS application. Upon entering the transaction number or other information related to the transaction, the mobile POS application can then transmit the information to a remote system, such as a money transfer provider system, via a wireless network. The remote system can check the status of the transfer and provide a response to the mobile POS application, which can then be relayed to the inquiring customer.

Some embodiments provide a mobile POS application which can perform unique calculations related to a transaction, such as foreign exchange rates, actual payout amounts, and associated fees. Such calculations can be performed on the mobile POS application itself using local data or performed on a remote computer with the result transmitted to the mobile POS application through a wireless network. Such calculations can further include information provided by an agent or other user, or information received from a remote source via the wireless network. For example, for a transaction to send money, the sender paying $100 from the United States to Mexico to be paid out in pesos, the mobile device can receive input from a user indicating a desired money transfer of $100 from the United States to Mexico. The mobile POS device can then send a request for a foreign exchange rate to the money transfer provider system, which returns an exchange rate. If the exchange rate is $1 to 10 pesos, the mobile POS device can calculate a payout amount of 1,000 pesos, and provide that information to the user. As stated above, the mobile POS application can further retrieve and/or calculate associated fees, use various types of data in its calculations, and/or retrieve real-time data from various sources.

In some instances, the mobile POS application can additionally handle the authorizing of a new agent, also known as agent on-boarding. The mobile POS application can collect information about the potential agent such as liquidity for transactions, class of trade, and personal identification information such as, address, phone number, email address, personal identification number, account information (e.g., stored value account identifier, bank account number and/or ABA routing number), tax number (e.g., Social Security Number or Taxpayer Identification Number), drivers' license number, state ID number, student ID number, etc. The mobile POS application can then transmit the information to a money transfer provider system for screening and approval by the money transfer provider. In some embodiments, the information can be used to set up an account associated with the applicant for use in money transfer transactions once the applicant is approved to be an agent. Moreover, according to some embodiments, the mobile POS application can run on a portable device comprising or connected to components adapted to gather information in various forms, which can also be transmitted to the money transfer provider for screening and approval. It will be understood by one having ordinary skill in the art that such components can include a card reader adapted to read information on an identification, credit, or other type of card, a camera that can be used to take pictures of the prospective agent and/or identification information, a microphone, and biometric sensors that can gather biometric data from the prospective agent, such as a fingerprint. The additional information gathered by one or more such components can also be used by the money transfer provider for screening and approval.

The mobile POS application can also be adapted to train agents, providing the agent with up-to-date information via the mobile device without the need for in-person training. According to some embodiments, the mobile POS application can include the functionality to conduct real-time and/or phone-based training on how to complete transactions, how to identify and stop fraud, how to complete KYC requirements, and more. For a mobile device having telephone functionality, the mobile POS device can be adapted to utilize these features to conduct a call for phone-based training. The mobile POS application can further utilize other features of a mobile device for real-time training, such as SMS, instant messaging, VOIP, or other types of real-time communication. The mobile POS application can be further adapted to download training materials comprising video, audio, text, or any combination thereof. Some training may be required prior to allowing the user to transfer money.

According to some embodiments, the mobile POS application and other applications, such as training and marketing programs, can be downloaded onto a mobile device by a variety of means, thereby accommodating the different types of mobile devices that may run the POS application. For example, the applications can be provided for download onto a mobile device through an application store, for example through Apple's iPhone App Store, or they can be downloaded onto the mobile device via over-the-air SMS ("OTA download"). Updates to the downloaded applications can be provided in a similar manner.

The mobile POS application can also be adapted to provide the agent with other forms of information from the money transfer provider. In such embodiments, the POS application can report incentivizing data such as numbers of transactions, compensation levels, and rewards for specific tiers of transactions completed. The mobile POS application can further be adapted to provide access to marketing promotions for customers.

A transaction to send money can be received at an application running on the money transfer provider system, which can be, for example, a server maintained by a money transfer provider. The transaction to send money can be completed based at least in part on the payment information associated with the transaction. In some cases, the payment information can indicate at least one destination account for the transaction. In such cases, completing the money transfer transaction can comprise crediting the at least one destination account indicated by the payment information. Alternatively, the payment information can indicate a plurality of destination accounts for the transaction to send money. In such cases, the payment information may further indicate a distribution of funds of the transaction to send money to each of the destination accounts. In such cases, completing the transaction to send money can comprise crediting each of the destination accounts indicated by the payment information and can be based on the distribution indicated by the payment information. Additional details of various embodiments of the present invention will be described below with reference to the figures.

FIG. 1 is a block diagram illustrating an exemplary system for making financial transfers with a mobile POS application, according to some embodiments of the invention. As illustrated here, the system 100 can include a money transfer provider system 140 such as the systems operated by Western Union or another money transfer provider service. The money transfer provider 140 can be communicatively coupled with a financial transfer network 155. Also communicatively coupled with the financial transfer network 155 can be one or more account providers 160 and 170, which can maintain, control, or otherwise manipulate source and destination accounts 165 and 175, respectively. The source account 165 can be any of a variety of accounts, such as a traditional bank account, in which case source account provider 160 can be a financial institution. According to other embodiments, the source account 165 can be a virtual (or e-money) wallet, in which case the source account provider 160 can be a mobile operator or agent. Similarly, the destination account 175 can be any of a variety of accounts, such as a bank or virtual (e-money) account, and the destination account provider 170 can be a financial institution, mobile operator, or agent accordingly. Additionally, as explained in embodiments detailed herein, a recipient of a money transfer may also receive the money in cash at a regular agent location. Generally speaking and as understood by one skilled in the art, the money transfer provider 140 can access a source account 165 of one account provider 160 and/or a destination account 175 of the same or a different account provider 170 to affect a transfer from and/or to the accounts 165 and 175 via the financial transfer network 155.

The money transfer provider system 145 can also be adapted to identify the entities and/or accounts associated with a transaction and/or determine a destination for a payment of the transaction. For example, the entities and/or accounts can be identified based on data maintained in a verification database or other repository, which can be maintained internally or externally to the money transfer provider system 145.

The system can also include an agent 120 of the money transfer provider 140. The agent 120 can comprise an individual, group, retail location, or other entity having a mobile device 121. Generally speaking, the agent 120 allows customers to access the services of the money transfer provider 140. A sender 110 can initiate a transaction to transfer money to a recipient.

The system 100 can also include a mobile network 130, such as a cellular or other wireless network, communicatively coupled with the mobile device 121 and the money transfer provider 140. It should be understood that while only one mobile network 130 is illustrated here for the sake of simplicity and clarity, multiple mobile networks 130 can be present. Also, it should be understood by someone having ordinary skill in the art that the communicative link between mobile device 121 and money transfer provider 140 can include additional communication networks and/or conduits; the money transfer provider 140 need not directly interface with the mobile network 130. For example, mobile device 121 can access the Internet through the mobile network, allowing the mobile POS application 125 to communicate with the money transfer provider system 145. The money transfer provider system 145, on the other hand, can access the Internet to receive the communication through a variety of means, which can include non-mobile networks, such as fiber-optic, coaxial cable, and/or other hard-wired means. It will be understood by one having ordinary skill in the art that the system 100 represents some embodiments of the invention, and that the invention allows for a variety of other configurations.

Figure 2:
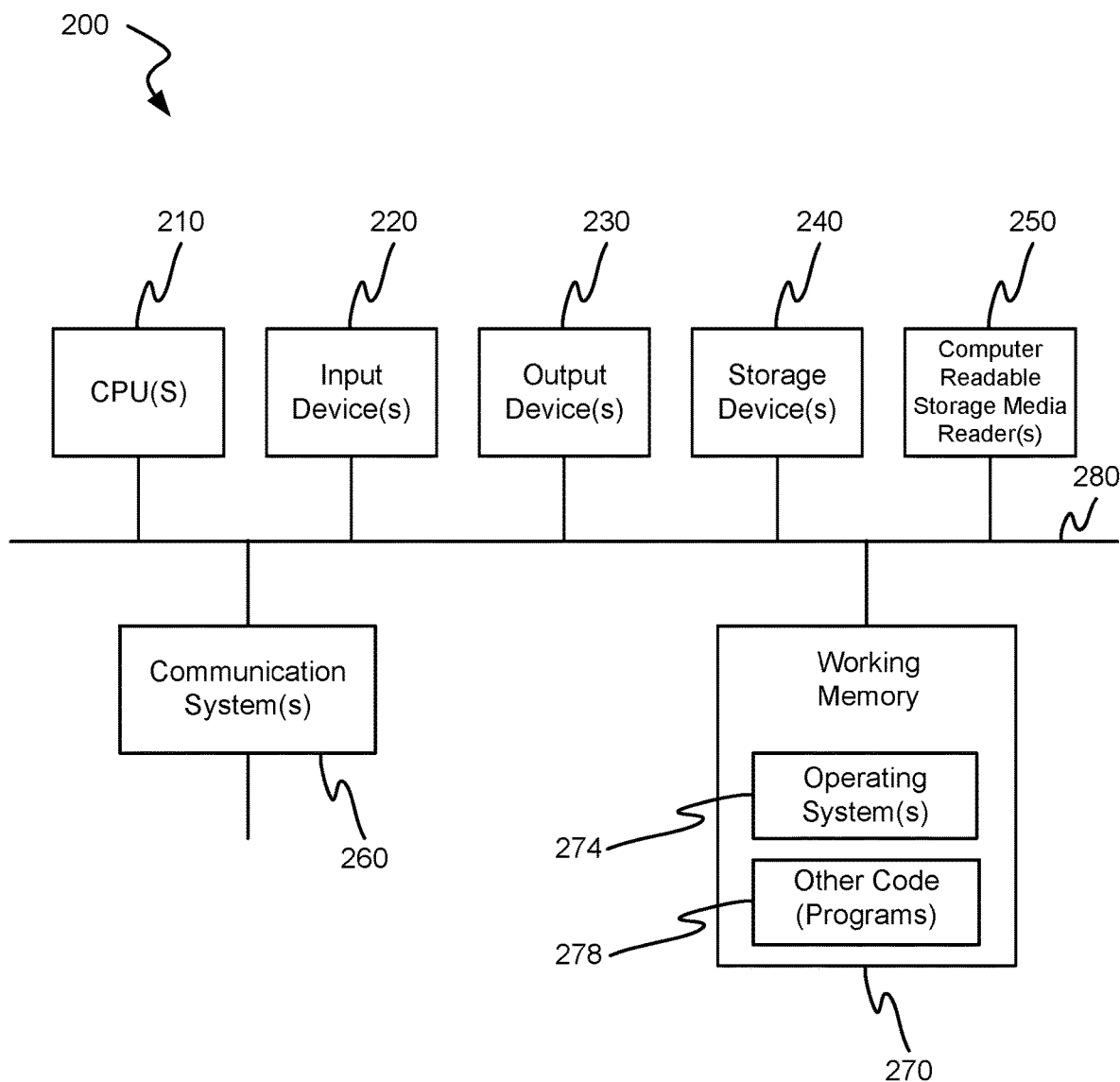
FIG. 2 is a block diagram illustrating an exemplary computing architecture upon which embodiments of the present invention may be implemented.

FIG. 2 is a block diagram illustrating an exemplary computing architecture adapted to run software applications and send and receive information through a communications system 260. This computing architecture illustrated can be used in whole, in part, or with various modifications, to provide the functions of the mobile device 121, the money transfer provider system 145, and/or other components of the invention such as those discussed above.

The computing architecture 200 is shown comprising hardware elements that can be electrically coupled via a bus 280. The hardware elements may include one or more central processing units 210, one or more input devices 220 (e.g., a mouse, a keyboard, a touch screen display, a number pad, a camera, a biometric sensor, etc.), and one or more output devices 230 (e.g., a display, a speaker, a printer, etc.). The computing architecture 200 can also include one or more storage device 240. By way of example, storage device(s) 240 can be disk drives, optical storage devices, solid-state storage device such as a random access memory ("RAM") and/or a read-only memory ("ROM"), which can be programmable, flash-updateable and/or the like.

The computing architecture 200 can additionally include a computer-readable storage media reader 250, a communications system 260 (e.g., a modem, a network card (wireless or wired), an infra-red communication device, Bluetooth™ device, cellular communication device, etc.), and working memory 270, which may include RAM and ROM devices as described above.

The computer-readable storage media reader 250 can further be connected to a computer-readable storage medium, together (and, optionally, in combination with storage device(s) 240) comprehensively representing remote, local, fixed, and/or removable storage devices plus storage media for temporarily and/or more permanently containing computer-readable information. The communications system 260 can permit data to be exchanged with a network, system, computer and/or other component described above.

The computing architecture 200 can also comprise software elements, shown as being currently located within a working memory 270, including an operating system 274 and/or other code 278. It should be appreciated that alternate embodiments of a computing architecture 200 can have numerous variations from that described above. For example, customized hardware might also be used and/or particular elements might be implemented in hardware, software (including portable software, such as applets), or both. Furthermore, connection to other computing devices such as network input/output and data acquisition devices can also occur.

Software of computing architecture 200 may include code 278 for implementing any or all of the function of the various elements of the architecture as described herein. For example, software, stored on and/or executed by a computer system such as system 200, can provide the functions of collecting, transmitting, and processing information relating to money transfer transactions and/or gathering, transmitting, and processing information from an applicant for determination by the money transfer provider to determine whether to allow the applicant to become an agent of the money transfer provider.

As noted above, embodiments of the present invention provide for conducting transactions and financial transfers utilizing a mobile device communicatively coupled with a mobile communications network and executing a mobile point-of-sale application. For example, one transaction can be to send money with a payment given to an agent, wherein the mobile POS device is used to conduct a transfer of money and an agent collects a payment from the sender to fund the transaction. Another transaction can be to receive a payment from a money transfer wherein the mobile POS device conducts the transaction to receive the money transfer, and an agent pays the receiver. Another feature of the present invention, according to certain embodiments, can be a mobile POS application providing for a calculation of a rate of exchange between different currencies. According to certain embodiments, a mobile POS application can also be used to gather photo identification to be used in a transaction. The present invention can also be configured to perform an on-boarding process, enabling a money transfer provider to determine whether to allow a user to become an agent of the money transfer provider. Each of these options will be described below in more detail with reference to FIGS. 3-7.

Figure 3:
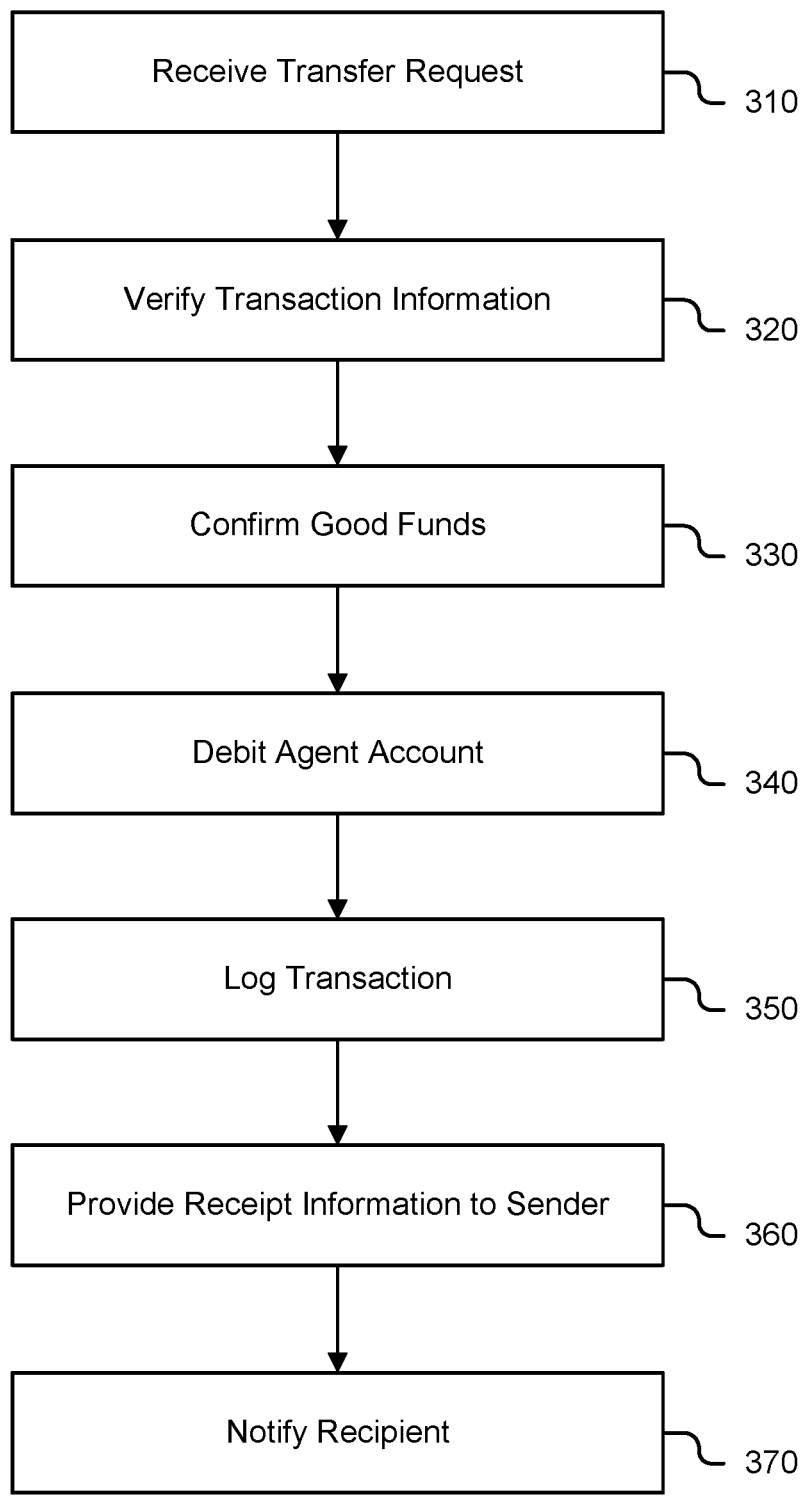
FIG. 3 illustrates an exemplary flow for a transaction to send money, according to one embodiment of the present invention.

FIG. 3 is a diagram representing a method to carry out a transaction to send money, according to one embodiment of the present invention. A mobile device running a mobile POS application can accept input from an agent, sender, or other user to initiate a transaction to send money, such as payment information and identification information. Payment information can include payment amount, name(s) and/or unique identifier(s) for one or more recipients, payment currency, destination country and/or currency, etc. Identification information can include information about the sender as well as information about an agent, and can include various data as described above. Upon receiving the transfer request 310, the money transfer provider system can then verify transaction information 320. As part of this verification process, as detailed above, the money transfer provider system can verify information against internal and/or external databases to ensure compliance with governmental regulations, proper identification and sufficient funds of source and destination accounts, proper identification of an agent associated with the mobile POS device, and/or perform other data verification measures. If the verification proves successful, the money transfer provider can then notify the agent via the mobile POS application to confirm good funds 330. The agent can then collect money from the sender, which can be in one or more forms (e.g., cash, check, money order, credit or debit card, etc.) and confirms successful collection of the funds to the mobile POS device, which can relay confirmation to the money transfer provider system. The money transfer provider system, in turn, can debit the agent account 340 either in real time or at a later point in time. The money transfer provider system can also log the transaction 350, by recording data relating to the transaction in one or more internal and/or external databases to preserve a record of the transaction. This data can be used in a future transaction to receive the money transfer. The money transfer provider system can then return receipt information 360, which may comprise an MTCN, to the to the sender by transmitting the information to the mobile POS application. The money transfer provider system can then notifies the recipient 370 of the money transfer transaction. The notification can be sent a variety of ways, such as a telephone call, telegram, email, SMS, U.S. postal letter, or other type of message, or any combination thereof. Furthermore, the notification can provide the recipient with notification of the transfer transaction and instructions and/or options for receiving the money.

Figure 4:
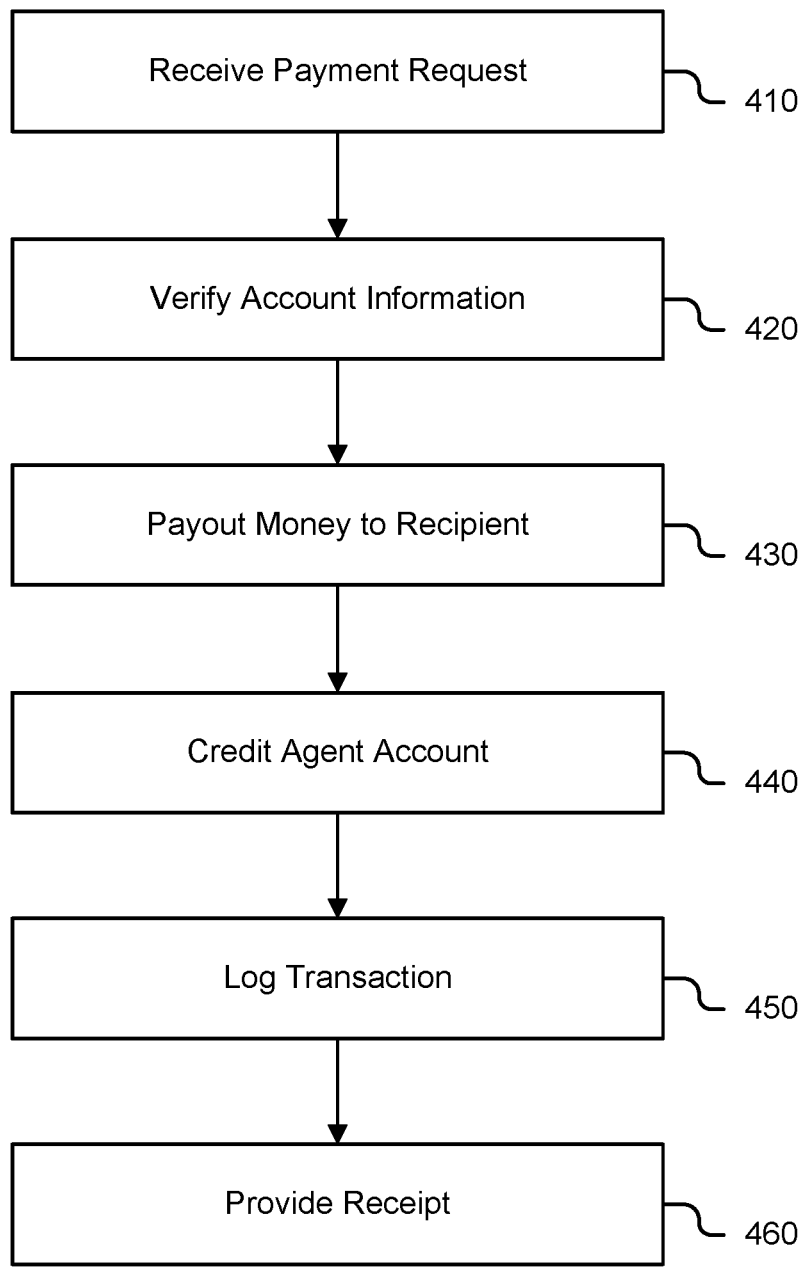
FIG. 4 illustrates an exemplary flow for a transaction to receive money, according to one embodiment of the present invention.

FIG. 4 is a diagram representing a method to carry out a transaction to receive money, according to one embodiment of the present invention. A mobile device running a mobile POS application can accept input from a recipient of a money transfer request, such as receipt information and identification information. Receipt information can include payment amount, name(s) and/or other information such as unique identifier(s) for the sender or receiver, location of where the corresponding transaction to send money was initiated, and/or currency, etc. As with a request to send money, identification information for a transaction to receive a money transfer can include information about the recipient as well as information about an agent, and can include various data as described above. Upon receiving the receive payment request 410, the money transfer provider system can then verify account information 420. Similar to the money transfer transaction, the verifying account information for a transaction to receive money may include the money transfer provider system utilizing internal and/or external databases to ensure proper identification and sufficient funds of source and destination accounts, proper identification of an agent associated with the mobile device, and/or perform other data verification measures. Upon successful verification, the money transfer provider can then notify the agent via the mobile POS application to payout money to the recipient 430. The agent pays money to the recipient, which can be in one or more forms (e.g., cash, check, money order, credit or debit card, etc.) and verifies successful payout of the funds to the mobile POS device, which relays confirmation to the money transfer provider system. The money transfer provider system, in turn, credits the agent account 440 either in real time or at a later point in time, and logs the transaction 450. The recipient is then given a receipt 460. The receipt can be generated from information provided by the money transfer provider to the mobile POS device and/or the agent who paid funds to the recipient.

Figure 5:
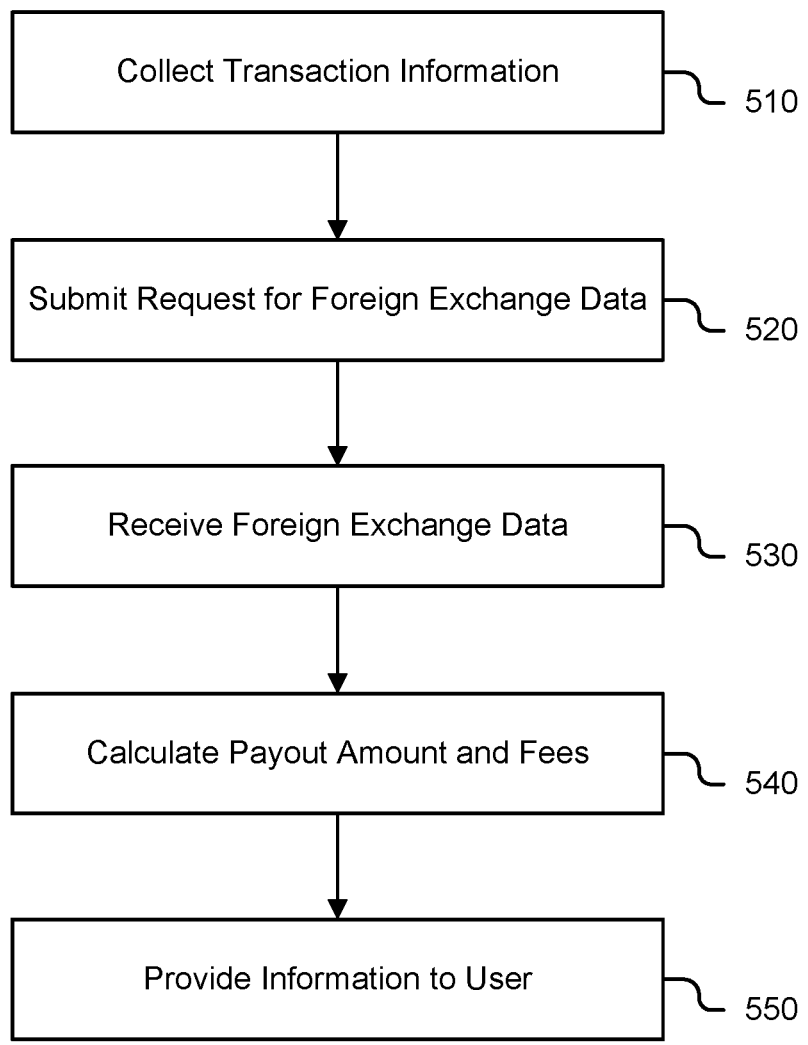
FIG. 5 illustrates an exemplary flow for providing a payout amount and fees with a foreign exchange rate, according to one embodiment of the present invention.

FIG. 5 is a diagram representing a method to calculate a payout amount and fees with a foreign exchange rate, according to one embodiment of the present invention. The process can be initiated by collecting transaction information 510, such as a money transfer as detailed in FIG. 3, and may be performed in conjunction with and/or parallel to such a money transfer, although it will be understood that this method can be performed independently from a money transfer transaction. According to the embodiment detailed in FIG. 5, the mobile POS device can then submit this information 520 to a money transfer provider system. The mobile POS device can receive foreign exchange data 530 from the money transfer provider system, using the data to calculate payout amount and fees 540 and provide the related information (e.g., foreign exchange rate, payout amount, fees, etc.) to the user 550. In light of the disclosure above, it will be understood that the present invention contemplates many other embodiments, including embodiments where a money transfer provider system performs the calculation and/or the mobile POS device calculate a foreign exchange rate and/or payout amount by using data obtained from remote sources other than a money transfer provider, such as the International Monetary Fund, government agencies, banks, corporations, etc.

Figure 6:
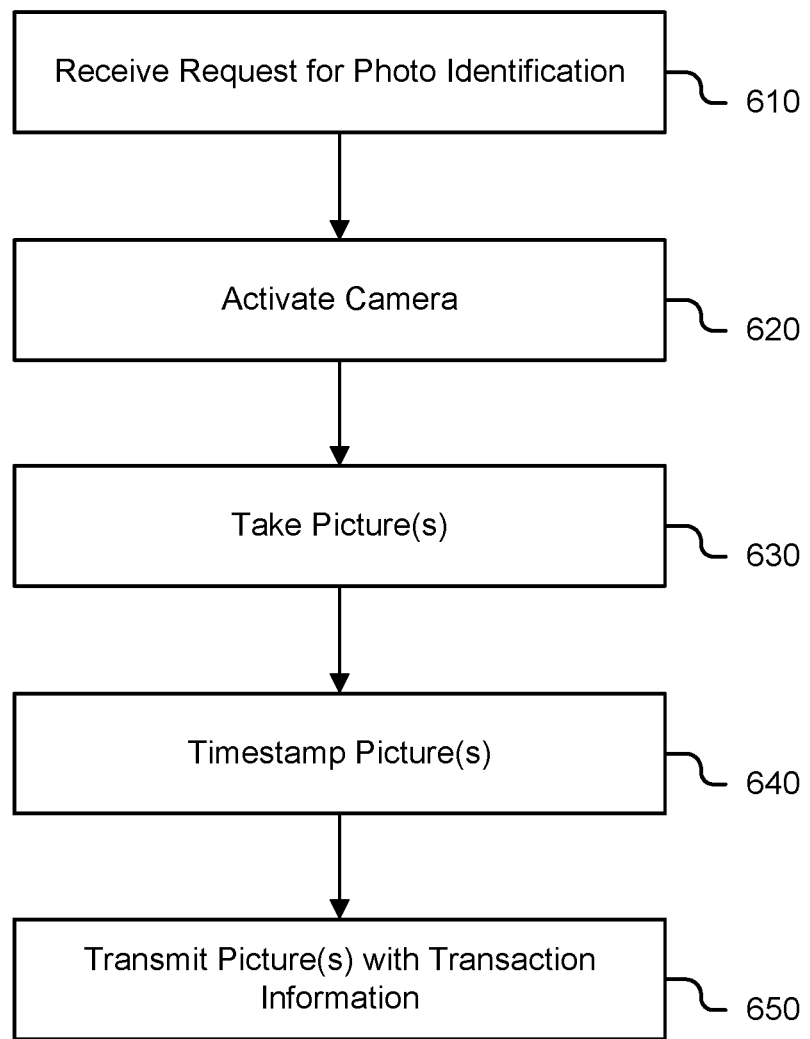
FIG. 6 illustrates an exemplary flow for a method of obtaining photos with a mobile device for use in transactions, according to one embodiment of the present invention.

FIG. 6 is a diagram representing a method of gathering photo identification with a camera coupled with a mobile device executing a mobile POS application for use in transactions conducted by the mobile POS application, according to certain embodiments of the present invention. The method can be triggered by a request for photo identification 610, which can occur at nearly any point during a transaction. For example, where a sender initiates a money transfer transaction, the mobile POS application itself can request photo identification while collecting identification information from the sender and/or agent to transmit to a money transfer provider system for verification. According to other embodiments, the money transfer provider system can send a request to the mobile POS application for photo identification after the money transfer provider system receives identification information from the mobile POS application, if, for example, the money transfer provider system has no photo identification for the sender and/or agent associated with the previously-submitted identification information. At some point after receiving the request for photo identification 610, the mobile POS application can activate a camera 620 coupled with the mobile device on which the mobile POS application is running. A user, such as an agent, can then use the camera to take pictures 630. The pictures, which are typically stored on the camera and/or mobile device as photographic data, can then be given a timestamp 640 and/or other identifying data. Such data is associated with and/or embedded into the photographic data representing the pictures, all of which can be transmitted with transaction information 650 by a mobile POS application to a mobile transfer provider system.

Figure 7:
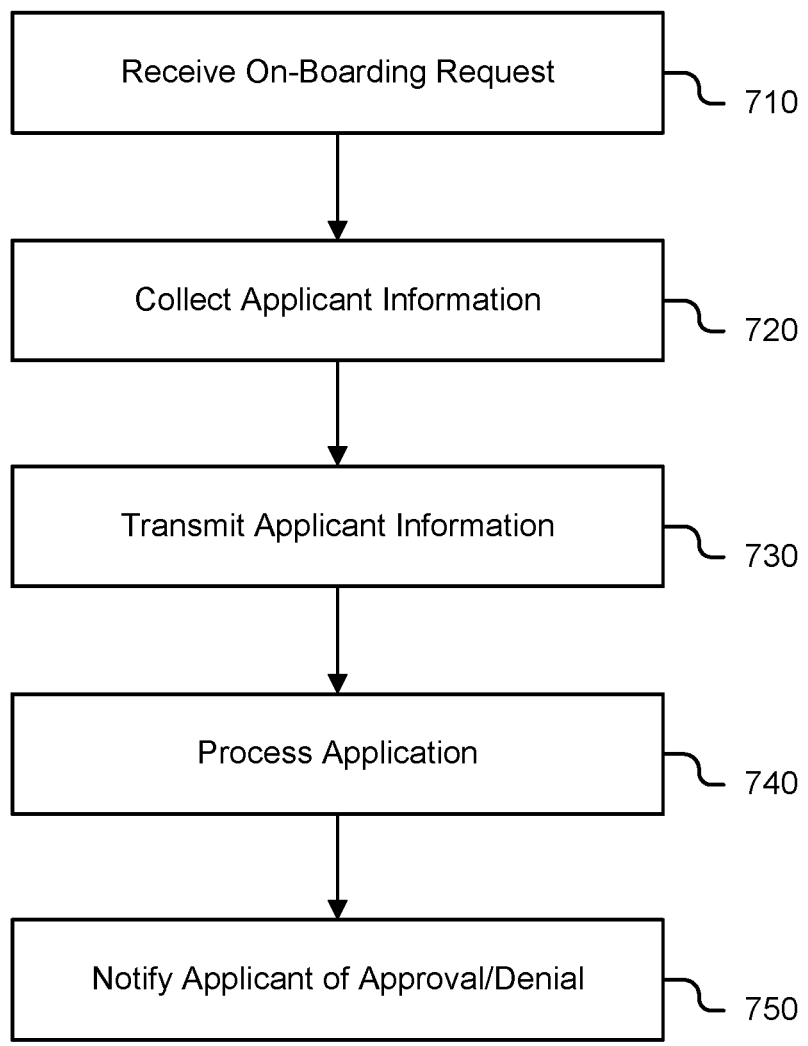
FIG. 7 illustrates an exemplary flow for a method of conducting an agent on-boarding process by utilizing the mobile POS application, according to one embodiment of the present invention.

FIG. 7 is a diagram representing an embodiment of a method for conducting an agent on-boarding process by utilizing the mobile POS application, according to the present invention. The method can begin where the mobile POS application receives an on-boarding request 710. This request can be initiated manually an applicant, selecting an option provided by the mobile POS application to begin the on-boarding process. According to other embodiments, the mobile POS application itself can automatically initiate the on-boarding process as part of or shortly after the installation of the mobile POS application onto a mobile device. The mobile POS application can then collect applicant information 720. As discussed above, such information can include as liquidity for transactions, class of trade, and personal identification information such as, address, phone number, email address, personal identification number, account information (e.g., stored value account identifier, bank account number and/or ABA routing number), tax number (e.g., Social Security Number or Taxpayer Identification Number), drivers' license number, state ID number, student ID number, etc. Collecting applicant information 720 can also include a method for gathering photo identification, such as that shown in FIG. 6, wherein the mobile POS application can collect photos of the applicant, the applicant's valid photo ID, and/or other objects or individuals for identification and verification purposes. The POS application can also collect biometric and/or other data, as described above, in conjunction with or as part of collecting applicant information 720. Once the information is adequately collected, the mobile POS application can transmit the applicant information 730 to a money transfer provider system to process the applicant's application 740. As with other transactions, the money transfer provider system may use internal and/or external databases, such as those maintained by governmental agencies, credit agencies, banks, and/or other entities, for processing and verification purposes. If the money transfer provider approves the applicant to be an agent of the money transfer provider, the money transfer provider may also set up an account associated with the applicant during or after processing the application 740. This account may be used for future money transfer transactions conducted by the mobile POS application by the agent. Finally, after processing the application 740, the applicant then can be notified of approval or denial of the application 750. This notification may be sent directly to the mobile POS application by the money transfer provider system, and/or by any other means such as a telephone call, telegram, email, SMS, U.S. postal letter, or other type of message, or any combination thereof. Furthermore, the notification can contain any additional instructions to complete the application process.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

The foregoing description further provided, for the purposes of explanation, numerous specific details to allow a thorough understanding of various embodiments of the present invention. It should be apparent, however, to one skilled in the art that embodiments of the present invention may be practiced without some of these specific details. In other instances, well-known structures and devices were shown in block diagram form. These exemplary embodiments are not intended to limit the scope, applicability, or configuration of the disclosure. Rather, the description of the exemplary embodiments provides those skilled in the art with an enabling description for implementing an exemplary embodiment. It should be understood that various changes may be made in the function and arrangement of elements without departing from the spirit and scope of the invention as set forth in the appended claims.

Also, it is noted that individual embodiments were described as a process and depicted as a flowchart, a flow diagram, a data flow diagram, a structure diagram, or a block diagram. Although a flowchart can describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function Finally, while illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for performing transactions using a transaction system, the method comprising:
   receiving, by a transaction system, user information identifying a first user;
   permitting, by the transaction system, the first user to be an authorized agent permitted to enter transaction information for requested transactions between senders and receivers, wherein the authorized agent is separate and distinct from the transaction senders and the receivers;
   in response to permitting the first user to be an authorized agent for requested transactions:
      (a) assigning, by the transaction system, an identification number to a point-of-sale application executing on a client device associated with the authorized agent;
      (b) transmitting, by the transaction system, the identification number to the client device; and
      (c) receiving, by the transaction system, a unique identifier from the client device, wherein the unique identifier is generated by the point-of-sale application executing on the client device based at least in part on the identification number assigned by the transaction system;
   receiving, by the transaction system, and from the point-of-sale application executing on the client device, transaction information for a first requested transaction between a first sender and a first receiver;
   determining, by the by the transaction system, based the transaction information, that photo identification is required for one or more parties of the first requested transaction;
   transmitting, from the transaction system, a request for photo identification for the one or more parties, to the point-of-sale application executing on the client device;
   receiving, by the transaction system, image data from the point-of-sale application executing on the client device, the image data including the photo identification for the one or more parties of the requested transaction;
   determining, by the transaction system, whether to process the first requested transaction between the first sender and the first receiver, based at least in part on a verification of the image data including the photo identification for the one or more parties of the first requested transaction; and
   causing, by the transaction system, the first requested transaction to be initiated based at least in part on an affirmative determination to process the first requested transaction.

2. The method of claim 1, wherein the user information identifying the first user is received from the client device, and wherein the user information includes biometric data associated with the first user.

3. The method of claim 1, wherein determining whether to process the first requested transaction between the first sender and the first receiver is based at least in part on (a) a verification of the image data including the photo identification for the one or more parties of the first requested transaction, (b) verification of additional image data including a photo identification of the authorized agent.

4. The method of claim 1, wherein the client device is a mobile computing device and the point-of-sale application is a mobile point-of-sale application configured to execute on the mobile computing device.

5. The method of claim 4, wherein communications between the transaction system and the mobile computing device are transmitted over a wireless public mobile communications network.

6. The method of claim 1, wherein causing the first requested transaction to be initiated comprises: receiving a transaction amount associated with the transaction information for the first requested transaction; modifying the transaction amount based on the authorized agent; and processing the first requested transaction with the modified transaction amount.

7. The method of claim 1, wherein determining whether or not to permit the first user to be an authorized agent permitted to enter transaction information for requested transactions between senders and receivers, comprises: transmitting, by the transaction system to the client device, real-time agent training materials; and determining that the first user has completed the real-time training materials via the point-of-sale application executing on the client device.

8. A computer system comprising:
   one or more network interfaces;
   one or more processors; and
   memory communicatively coupled with and readable by the one or more processors and having stored therein processor-readable instructions which, when executed by the one or more processors, cause the computer system to:
      receive user information identifying a first user;
      permit the first user to be an authorized agent permitted to enter transaction information for requested transactions between senders and receivers, wherein the authorized agent is separate and distinct from the transaction senders and the receivers;
      in response to permitting the first user to be an authorized agent for requested transactions:
         (a) assign an identification number to a point-of-sale application executing on a client device associated with the authorized agent;
         (b) transmit the identification number to the client device; and
         (c) receive a unique identifier from the client device, wherein the unique identifier is generated by the point-of-sale application executing on the client device based at least in part on the identification number assigned by the computer system;
      receive, from the point-of-sale application executing on the client device, transaction information for a first requested transaction between a first sender and a first receiver;
      determine based the transaction information, that photo identification is required for one or more parties of the first requested transaction;
      transmit a request for photo identification for the one or more parties, to the point-of-sale application executing on the client device;
      receive image data from the point-of-sale application executing on the client device, the image data including the photo identification for the one or more parties of the requested transaction;
      determine whether to process the first requested transaction between the first sender and the first receiver, based at least in part on a verification of the image data including the photo identification for the one or more parties of the first requested transaction; and cause the first requested transaction to be initiated based at least in part on an affirmative determination to process the first requested transaction.

9. The computer system of claim 8, wherein the user information identifying the first user is received from the client device, and wherein the user information includes biometric data associated with the first user.

10. The computer system of claim 8, wherein determining whether to process the first requested transaction between the first sender and the first receiver is based at least in part on (a) a verification of the image data including the photo identification for the one or more parties of the first requested transaction, (b) verification of additional image data including a photo identification of the authorized agent.

11. The computer system of claim 8, wherein the client device is a mobile computing device and the point-of-sale application is a mobile point-of-sale application configured to execute on the mobile computing device.

12. The computer system of claim 11, wherein communications between the computer system and the mobile computing device are transmitted over a wireless public mobile communications network.

13. The computer system of claim 8, wherein causing the first requested transaction to be initiated comprises: receiving a transaction amount associated with the transaction information for the first requested transaction; modifying the transaction amount based on the authorized agent; and processing the first requested transaction with the modified transaction amount.

14. The computer system of claim 8, wherein determining whether or not to permit the first user to be an authorized agent permitted to enter transaction information for requested transactions between senders and receivers, comprises: transmitting real-time agent training materials to the client device; and determining that the first user has completed the real-time training materials via the point-of-sale application executing on the client device.

15. A non-transitory machine readable medium having instructions stored thereon, which, when executed by a transaction system comprising one or more processors, cause the transaction system to:

receive user information identifying a first user;

permit the first user to be an authorized agent permitted to enter transaction information for requested transactions between senders and receivers, wherein the authorized agent is separate and distinct from the transaction senders and the receivers;

in response to permitting the first user to be an authorized agent for requested transactions:

(a) assign an identification number to a point-of-sale application executing on a client device associated with the authorized agent;

(b) transmit the identification number to the client device; and (c) receive a unique identifier from the client device, wherein the unique identifier is generated by the point-of-sale application executing on the client device based at least in part on the identification number assigned by the transaction system;

receive, from the point-of-sale application executing on the client device, transaction information for a first requested transaction between a first sender and a first receiver;

determine based the transaction information, that photo identification is required for one or more parties of the first requested transaction;

transmit a request for photo identification for the one or more parties, to the point-of-sale application executing on the client device;

receive image data from the point-of-sale application executing on the client device, the image data including the photo identification for the one or more parties of the requested transaction;

determine whether to process the first requested transaction between the first sender and the first receiver, based at least in part on a verification of the image data including the photo identification for the one or more parties of the first requested transaction; and cause the first requested transaction to be initiated based at least in part on an affirmative determination to process the first requested transaction.

16. The non-transitory machine readable medium of claim 15, wherein the user information identifying the first user is received from the client device, and wherein the user information includes biometric data associated with the first user.

17. The non-transitory machine readable medium of claim 15, wherein determining whether to process the first requested transaction between the first sender and the first receiver is based at least in part on (a) a verification of the image data including the photo identification for the one or more parties of the first requested transaction, (b) verification of additional image data including a photo identification of the authorized agent.

18. The non-transitory machine readable medium of claim 15, wherein the client device is a mobile computing device and the point-of-sale application is a mobile point-of-sale application configured to execute on the mobile computing device.

19. The non-transitory machine readable medium of claim 18, wherein communications between the transaction system and the mobile computing device are transmitted over a wireless public mobile communications network.

20. The non-transitory machine readable medium of claim 15, wherein causing the first requested transaction to be initiated comprises: receiving a transaction amount associated with the transaction information for the first requested transaction; modifying the transaction amount based on the authorized agent; and processing the first requested transaction with the modified transaction amount.

* * * * *